Patented Mar. 30, 1926.

1,579,196

UNITED STATES PATENT OFFICE.

EDWARD WILLIAM COON, OF PHILADELPHIA, PENNSYLVANIA.

PROCESS FOR RIPENING CHEESE.

No Drawing.    Application filed February 27, 1926. Serial No. 91,262.

*To all whom it may concern:*

Be it known that I, EDWARD WILLIAM COON, a citizen of the United States, residing at 29 South Water St., Philadelphia, in the county of Philadelphia and State of Pennsylvania, have invented certain new and useful Improvements in Processes for Ripening Cheese, and do hereby declare the following to be a full, clear, and exact description of the invention, such as will enable others skilled in the art to which it appertains to make and use the same.

This invention relates to an improvement in a process for ripening cheese, the application being a continuation in part of the application filed September 1, 1925, Serial No. 53,949.

It is well known that cheese ripens through fermentation. Fermentation takes place more rapidly where surrounding conditions are moist and certain temperatures maintained which are most beneficial to the growth of the bacteria.

The utility of increasing the moisture of the air in the room devoted to the prime purpose of ripening cheese has been found, through long experiment by the petitioner, to be of the highest importance.

The prime object of this invention is to provide a process for the ripening of cheese through the agency of humidified air at certain temperatures supplied to the cheese ripening chamber, the humidified air having a temperature range and a moisture percentage determined by years of experiment by the petitioner.

Further objects of this invention will appear from the following detailed description of the process and as set forth in the claim.

It has been determined that unparaffined cheese shrinks in weight very considerably as it is held for the purpose of ripening in a room or chamber set aside for that purpose, due to the contained moisture evaporating through the cheese rind; it is evident therefore, that the air in the room devoted to the ripening of cheese should carry a moisture percentage of near the saturation point. As paraffined cheeses are practically hermetically sealed they do not ripen as rapidly as if they had not been paraffined. Fermentation requires air for rapid reproduction of the bacteria causing the same. The evaporation of the moisture contained in the cheese should be held to the minimum. If cheese is carried in saturated air, rind rot will ensue.

The process for ripening cheese within the room or chamber as described and claimed in this application consists of supplying humidified air at certain specified temperatures through suitable means to a room set aside for the purpose, the humidified air to have a temperature range of from 45 degrees to 75 degrees Fahrenheit, and a moisture percentage of from 65% to 95%. Many years of experimenting by the inventor has developed this particular process and group of temperature and humidity percentage ranges.

The common practice, process or method for ripening cheese employed in the past and present has been to carry the cheese which are usually paraffined, at a temperature of anywhere from 40 degrees to 80 degrees Fahrenheit, the lower temperature range being maintained through the agency of artificial refrigeration where the temperature of the air is reduced by pipes in the room carrying ammonia gas or carbon dioxide gas or some similar agency.

While this old and common process maintains temperature, the cold pipes attract the moisture in the air, which in turn being dried out, attracts the moisture of the cheese, making the finished product dry and crumbly, in addition causing extra expense on finished ripened cheese.

It is admitted that well ripened cheese is more digestible and has a more attractive flavor than the fresh product. The usual means employed in aging cheese, longer time is required to get an approximate result and quite often cheese is spoiled due to rind rot. This process being of much shorter duration eliminates both of the adverse features of dryness and rind rot in the finished product.

This invention provides means for producing cheese in which the lactic bacilli are cultivated to the highest degree. It is well known to science that certain groups of lactic bacilli are the active principals in milk which are most beneficial to the digestive tract, attaching and destroying the noxious bacilli in the intestinal tract which ordinarily produce toxic conditions. In the recently developed and highly advertised product known as package cheese, the Pasteurization of the cheese is highly commended as a step in a forward direction, but as a matter of fact, this Pasteurization destroys all bacilli including the lactic bacilli, leaving the product with dead organism in place of active beneficial organisms. Dead organisms are certainly not beneficial to the digestive tract. Moreover, the heat of Pasteurization drives off the attractive esthers or flavor of cheese, leaving the product with a neutral dead flavor. It is well known that patents have been allowed on the manufacture of the above cooked product. Welsh rarebit, in other words, cooked cheese, has been an article of diet for many years, probably centuries. No one acquainted with Welsh rarebit, would think of eating it unless hot right off the fire prior to its becoming cold, stringy and tough, realizing that once in this condition, it is highly indigestible.

As an embodiment of this invention, a cheese may be taken having an original moisture content of 36%. A temperature of from 65° F., to 70° F., may then be given to this cheese, but in order to obtain the finished product according to this invention, a humidity percentage of from 85% to 90% is applied, thereby bringing into suitable combination temperatures and humidity percentages. In order to illustrate another embodiment a cheese having a moisture content of 40% may be taken and given a temperature of from 55° F., to 60° F., and obtain a finished product with the combination of this temperature and humidity percentage of from 75% to 80%, while cheese carrying 38% of moisture will produce a finished product with a combination of a temperature range from 60° F., to 65° F., and a humidity percentage of from 80% to 85%. It is apparent therefore, that cheese carrying an original moisture percentage of from 36% to 40% may be made into the finished product as described above between the limits of 55° F., to 70° F., in combination with a humidity percentage of from 75% to 90%. The limits of 45° to 75° temperature in combination with humidity percentages of from 65% to 95% are extended to take care of cheese in which the original moisture content is either above or below the moisture content as described above.

What I claim is:

1. A process for ripening cheese, consisting of supplying, through suitable means, humidified air to a room or chamber set aside for the purpose, the humidified air to have a range of temperature from 45° to 75° F., and a moisture percentage of from 65% to 95%.

2. A process for ripening cheese having an original moisture percentage of 36% to 40% and subjecting it to a temperature of 55° F., to 70° F., in combination with a humidity percentage of from 75% to 90%.

In testimony whereof I affix my signature.

EDWARD WILLIAM COON.